March 13, 1934.                A. E. JONES                1,950,925
                                SPORT GLASSES
                             Filed Aug. 8, 1929
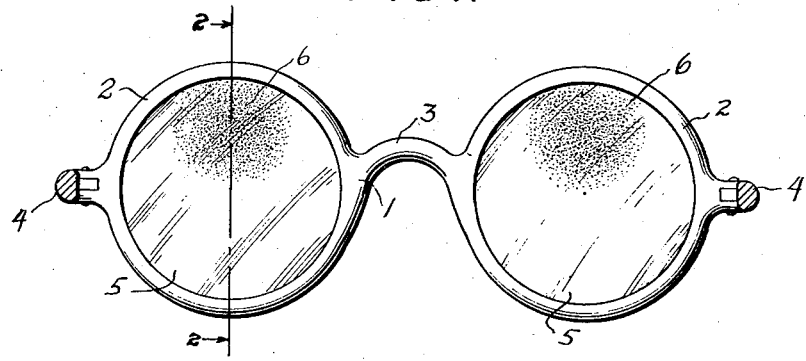
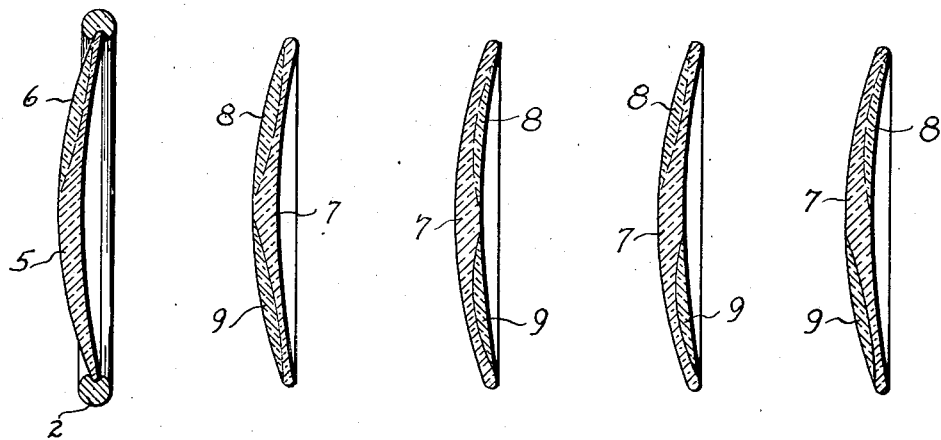
Inventor
ALFRED E. JONES
By Semmes & Semmes
           Attorneys Patented Mar. 13, 1934

1,950,925

UNITED STATES PATENT OFFICE 1,950,925

SPORT GLASSES

Alfred Edwin Jones, Spokane, Wash.

Application August 3, 1929, Serial No. 384,271

6 Claims. (Cl. 88—54)

This invention relates in general to spectacles and more particularly has reference to lenses for use in sport glasses.

There are many sources of light which detrimentally affect the human eye, resulting in discomfort to the person looking in the direction of the light source, and sometimes in permanent injury. These light sources are encountered by nearly everyone, both out of doors and within buildings. For instance, persons engaging in out-of-doors recreations, such as golf, tennis, boating, aviation and other forms of amusement, find the glare from the sun and artificial light sources inconvenient, and at times absolutely blinding. This is particularly true with persons suffering from a sensitive retina.

Another instance where glare has to be dealt with is in homes, offices, etc., wherein artificial illumination is employed. Despite the many improvements in artificial illumination, there are still many light sources which give rise to glare when one faces in the direction of the light. Persons working at desks often have to face a light while reading and receive considerable glare from the light source. Glare retards the functioning of the fluid in the rods and cones of the retina. This retardation has an injurious effect on the rods and cones, hinders vision and detrimentally affects the eye. Glare may be avoided by the person turning his back on the source of glare, or may be partially eliminated by the person wearing an eye shield; however this is often inconvenient, and the person may of necessity have to face the source of glare.

Spectacles and glasses have been provided with dark portions on the upper part of the lenses to reduce the intensity of the light passing through the upper part thereof. With such glasses the wearer may bow his head downward so that the darkened portions of the lenses are in the path of the light rays emanating from the source. While spectacles and glasses provided with lenses of this type aid materially in reducing or offsetting the element of glare, they, nevertheless, have certain disadvantages. For instance, there is a sharp line of demarcation between the clear and the darkened portion of the lenses, and in some lenses a white line can be detected between the clear and the darkened portions. When the lenses are so constructed, there is a sudden change in the intensity of light falling on the eye, due to the bowing of the head.

Lenses of this type may serve adequately for automobile driving, but the dark portions are too dark even where the dark portion adjoins the clear glass for use indoors. Also, due to the darkening effect of the lenses, even adjacent the clear portions, it is necessary to observe objects through the clear portion to clearly see them, except when highly illuminated as is the case of automobile headlights. Some people have eyes that are not readily adjustable to take care of the sudden change in the intensity of light and are thereby inconvenienced or injured.

The characteristic of the above described lenses is due to the manner in which they are manufactured. Most of these lenses are made by cementing, flashing or otherwise securing a blank of the darkened glass onto the clear lens. With this construction there is no intermingling of the dark and clear glass to secure a gradual variation in the intensity of the light received by the eye as the head is tilted forward or backward. Therefore, the change in intensity is rather abrupt.

A major object of this invention is to devise spectacles and glasses provided with lenses which will be free from the defects inherent in the lenses heretofore developed.

Another object of this invention is to devise a lens having a portion formed of uncolored or slightly tinted glass and a portion formed of darkened glass, both of which are transparent and in which the light and darkened, or glare-absorbing, glasses are intermingled or "married," so that there is no distinct line of demarcation between the glasses.

Yet another object of this invention is to devise methods of manufacturing lenses having a portion formed of clear or tinted glass and another portion formed of darkened or colored glass, or a glass capable of reducing glare, in which there is no apparent line of demarcation between the glasses.

A further object of this invention is to provide spectacle lenses of the bifocal type, having darkened portions, and in which there is no apparent line of demarcation between the light and darkened portions of the lens.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The present invention is based upon the concept of forming lenses—prepared so as to have no refracting characteristics, or according to prescription, in which case the lenses may or may not be provided with bifocal segments—with darkened areas, which will serve to protect the eyes of the wearer from glare. In accordance with this invention the glass forming the dark portions of the lens is intermingled or "married" with the uncolored or tinted glass so that there is a gradual merging of the colored glass into the uncolored or tinted glass.

In order to make my invention more clearly understood, I have shown, in the accompanying drawing, means for carrying the same into practical effect without limiting the improvements in their useful applications to the particular constructions, which, for the purpose of explanation, have been made the subject of illustration.

In the drawing:

Figure 1 shows a pair of glasses having lenses constructed in accordance with the present invention.

Figure 2 is a sectional view taken on line 2—2 of Figure 1, showing the manner in which the dark glass is mounted on the lens of clear or tinted glass.

Figure 3 is a view similar to Figure 2, showing a form of my invention in which the lens is of the bifocal type.

Figure 4 is a sectional view of another modified form of my invention.

Figure 5 is a sectional view of still another modification of the invention.

Figure 6 is a view showing a still further modified form.

In Figure 1 of the drawing there is shown a pair of glasses having the frame or mounting 1, comprising the usual rims or lens holders 2 and the bridge or nose piece 3. Suitable bows 4 are hinged or otherwise fastened to the rims 2 and serve the usual function of retaining the glasses in proper position on the wearer. Lenses 5, constructed according to the present invention, are mounted in the rims 2. I wish it to be clearly understood that other types of frames or mountings may be employed, if desired.

As hereinbefore pointed out, and as shown in the drawing, lenses which are plano or which may be prepared according to prescriptions and which may or may not be provided with bifocal segments, may embody the present invention. Lenses of either of the above types are provided with portions above the geometrical center, formed of glass, which may be darkened, colored or otherwise treated or compounded to prevent glare present in a beam of light passing therethrough.

Both the lens and the glare-reducing portion are preferably formed of glass from the same batch, the glare-reducing glass merely having some substance incorporated therein to color or darken it so as to render it capable of filtering the glare from light rays. Of course, the uncolored or tinted and the dark portions of the lens may be formed of any glasses which will intermingle or "marry." As shown in the drawing, the body of colored or darkened glass is thickest in the central portion and is extremely thin at the edges.

The dark or colored body of glass is so associated with the uncolored or tinted glass that it is quite impossible to determine exactly where the clear and colored or glare-absorbing glasses meet. This effect is very desirable because of the gradual variation from the uncolored or tinted to the darkest portion of the colored glass, which permits the wearer to slowly and gradually decrease or increase the intensity of light falling upon his eyes. An effect such as above described cannot be obtained by merely securing portions of a lens together, such as by cementing or by the other methods heretofore employed. There must be an intermingling of the colored glass into the uncolored or tinted glass; that is, as termed in the art, there must be a "marrying" of the uncolored or tinted glass with the colored or glare-reducing glass.

Lenses of the character herein described may be manufactured by forming a recess or cavity in a lens blank. A button or body of glass having a refractive index substantially the same as that of the lens, and of practically the same physical characteristics, and colored or treated to prevent glare passing therethrough, is fitted into the cavity in the lens. This is accomplished by shaping a convex surface on the button corresponding to the concave surface of the cavity in the lens blank. Of course, if desired, the cavity in the lens may be shaped convex or flat and the button adapted to fit therein. Also, depressions of other shapes may be made in the lens. The lens blank and button are then placed in a suitable oven and subjected to an intense heat; that is, to a temperature much higher than is employed in making bifocal lenses. It is within the scope of the present invention to place a glass element between the two glasses prior to the heating operation.

After heating the lens blank and the button at the relatively high temperature for a sufficient length of time, the glass of the button intermingles or "marries" with the glass of the lens blank. By heating the lens blank and the button as above described, to secure the intermingling or "marrying" of the glasses, the sharp line of demarcation between the glass of the lens blank and the glass of the glare-reducing button disappears.

After effecting the "marrying" of the glass of the lens blank with glass of the button, the lens may be finished either plano or to any desired form or power.

Another method of forming lenses in accordance with this invention is to place a quantity of colored or glare-reducing glass in a mold and then pour an uncolored or tinted glass about or on it. After the glasses have hardened sufficiently to take the form of the mold, and are yet of sufficient plasticity to be further shaped, the casting or blank may be removed and placed on a second mold to shape the casting or blank to the desired curvature. The second mold may have curvatures which are convex or concave, depending upon the form desired. By placing the blank in the second mold the body of colored glass is forced into the uncolored or tinted glass and the latter is allowed to spread sufficiently so that lenses may be readily cut therefrom. The blank may be of any desired size so that any number of lenses may be cut therefrom. If desired, the uncolored or tinted glass may be placed in first and the glare-absorbing glass placed on the uncolored or tinted glass. This method is of importance because of the economy that may be practiced in its employment.

When desired the glass in the second mold may be pressed to effect the results sought.

The present invention is also applicable to lenses of the bifocal type; that is, of the type provided with a segment of glass of a different refractive index inserted in the lens. In Figure 3 there is shown a lens 7, in which both the colored glass body 8 and the segment 9 for producing the bifocal effect are inserted in recesses formed on the convex side of the lens. Other arrangements of the colored body 8 and the segment 9 may be made. In Figure 4 both of the bodies 8 and 9 are on the concave side of the lens 7. Figure 5 shows a modification which may be desired under certain conditions, in which the colored body 8 is on the convex side and the segment 9 on the concave side of the lens. A lens having the colored body on the concave side and the segment 9 on the convex side may also be provided, as shown in Figure 6.

I have found it advantageous to provide lenses of the bifocal type with glare-absorbing portions because of the comfort afforded a person requiring glasses having this type of lenses. For instance, a person requiring glasses having bifocal lenses may read through the bifocal segments while facing the light source and yet will not be troubled with the glare ordinarily encountered. The glare-absorbing portion casts a shadow on the eye shading the pupil from the light source.

It is to be understood that after lenses of either of the several forms herein described are made, they may be ground and polished as desired. Also, when desired, the lenses may be fire polished.

While in the foregoing description the lenses have been described as being formed from uncolored glass, I wish it to be clearly understood that glass having any desired tint may be used.

Lenses constructed in accordance with this invention are particularly of value since the colored glass portion blends gradually into the uncolored or tinted glass, producing a result unattainable with the lenses heretofore developed.

Glasses fitted with lenses made according to my invention are of particular value to a golfer, for instance, who may have to make a difficult shot while facing the sun. The utility of the lenses for other purposes is, of course, apparent. One of the outstanding advantages of my lenses is that the wearer may satisfactorily use the glasses for all normal purposes and yet bring the glare-absorbing portions into his line of vision when needed.

By constructing the lenses as herein described, there is no distinct line of demarcation between the glare-absorbing portion of the lens and the portion through which the wearer normally makes observations. Thus when the glare-absorbing portions are formed from darkened glass, the shade of the glass varies very gradually from the deepest shade at the thickest portion of the colored glass to a region where the colored and the clear or tinted glasses merge. This makes the glasses of particular value for use by a person working at a desk while facing a light. Under such circumstances the glare of the light is prevented from reaching the person's eyes and yet he may easily and clearly see objects and other things at will.

While I have shown and described the preferred embodiment of my invention, I wish it to be understood that I do not confine myself to the precise details of construction herein set forth, by way of illustration, as it is apparent that many changes and variations may be made therein by those skilled in the art without departing from the spirit of the invention or exceeding the scope of the appended claims.

I claim:

1. A lens having a plurality of depressions formed therein, one of said depressions being in the upper portion of the lens and the other being in the lower portion thereof, a body of glare-absorbing glass fitted into the upper depression and a bifocal segment fitted into the lower depression such glare absorbing glass being so married into the lens that there is no apparent line of demarcation between the glare absorbing glass and the lens.

2. A lens having a plurality of depressions formed on the same side of the lens, one of said depressions being in the upper portion of the lens and the other being in the lower portion thereof, a body of glare-absorbing glass fitted into the upper depression, a bifocal segment fitted into the lower depression, the body of the glare-absorbing glass being married into the glass of the lens so that no line of demarcation is visible.

3. A lens having a plurality of depressions formed therein, a body of glare-absorbing glass fitted into one of said depressions and a bifocal segment fitted into the other depression, said body being so married into the lens that there is no apparent line of demarcation.

4. A lens having a plurality of depressions formed therein, one of said depressions being on one side of the lens and the other depression being on the other side, a body of glare-absorbing glass fitted into one of the depressions, and a bifocal segment fitted into the other depression, the body of the glare-absorbing glass being married into the glass of the lens so that no line of demarcation is visible.

5. A lens having a plurality of depressions formed therein, one of said depressions being in the upper portion of the lens and on one side thereof, the other depression being in the lower portion of the lens and on the side opposite to the upper depression, a body of glare-absorbing glass fitted into the upper depression, and a bifocal segment fitted into the lower depression, the body of the glare-absorbing glass being married into the glass of the lens so that no line of demarcation is visible.

6. A spectacle lens having a cavity formed in a portion thereof, a body of glass capable of absorbing the glare from light rays mounted in said cavity, said glare absorbing glass being so married into the lens that there is no apparent line of demarcation between the glare absorbing glass and the lens.

ALFRED EDWIN JONES.